United States Patent [19]
Truong et al.

[11] Patent Number: 6,136,428
[45] Date of Patent: Oct. 24, 2000

[54] MAGNETIC RECORDING MEDIA PREPARED FROM MAGNETIC PARTICLES HAVING AN EXTREMELY THIN, CONTINUOUS, AMORPHOUS, ALUMINUM HYDROUS OXIDE COATING

[75] Inventors: Jack G. Truong, Minneapolis; Thomas E. Wood, Maplewood, both of Minn.

[73] Assignee: Imation Corp., Oakdale, Minn.

[21] Appl. No.: 08/457,200

[22] Filed: Jun. 1, 1995

Related U.S. Application Data

[62] Division of application No. 07/818,852, Jan. 10, 1992, Pat. No. 5,965,194.

[51] Int. Cl.$^7$ .................................................. G11B 5/712
[52] U.S. Cl. ..................... 428/323; 428/328; 428/329; 428/403; 428/407; 428/694 BA; 428/694 BH; 428/900
[58] Field of Search .................... 428/323, 328, 428/329, 403, 694 BA, 694 BH, 900, 407

[56] References Cited

U.S. PATENT DOCUMENTS

| | | | |
|---|---|---|---|
| 2,085,129 | 6/1937 | Stoewener | 252/6 |
| 2,885,366 | 5/1959 | Iler | 252/313 |
| 3,535,245 | 10/1970 | Lindquist | 252/62.58 |
| 3,696,032 | 10/1972 | Haensel | 210/42 |
| 4,074,002 | 2/1978 | Hack et al. | 428/331 |
| 4,133,677 | 1/1979 | Matsui et al. | 75/0.5 AA |
| 4,229,234 | 10/1980 | Krutenat et al. | 148/105 |
| 4,280,918 | 7/1981 | Homola et al. | 252/62.51 |
| 4,309,459 | 1/1982 | Tokuoka | 427/219 |
| 4,321,303 | 3/1982 | Morita et al. | 428/404 |
| 4,336,310 | 6/1982 | Okuyama et al. | 428/447 |
| 4,400,432 | 8/1983 | Buxbaum et al. | 428/403 |
| 4,438,156 | 3/1984 | Homola et al. | 427/57 |
| 4,512,682 | 4/1985 | Mungons | 403/390 |
| 4,603,080 | 7/1986 | Takazawa et al. | 428/331 |
| 4,707,593 | 11/1987 | Murata et al. | 235/487 |
| 4,761,243 | 8/1988 | Kakuishi et al. | 252/62.54 |
| 4,789,581 | 12/1988 | Fukke et al. | 428/65 |
| 4,944,802 | 7/1990 | Chagnon et al. | 106/20 |
| 5,029,317 | 7/1991 | Kawai et al. | 360/131 |
| 5,039,559 | 8/1991 | Sang et al. | 427/213.3 |
| 5,164,259 | 11/1992 | Ishida et al. | 428/323 |
| 5,217,804 | 6/1993 | James et al. | 428/329 |
| 5,229,259 | 7/1993 | Yokota | 430/523 |
| 5,242,752 | 9/1993 | Isobe et al. | 428/329 |

FOREIGN PATENT DOCUMENTS

| | | |
|---|---|---|
| 0 118 253 | 9/1984 | European Pat. Off. . |
| 0 437 635 | 7/1991 | European Pat. Off. . |
| 3422916 | 1/1986 | Germany . |
| 61-222207 | 10/1986 | Japan . |
| 1-119519 | 5/1989 | Japan . |
| 01176229 | 7/1989 | Japan . |
| 1-176229 | 7/1989 | Japan . |
| WO-9015364 | 12/1990 | WIPO . |

OTHER PUBLICATIONS

Kratohvil et al. "Preparation and properties of coated uniform inorganic Colloidal Particles: I Aluminum Hydrous Oxide on Hematite, Chromia, and Titania" Advanced Ceramic Materials vol. 2 No. 4 Oct. 1987.

Farley et al., "A Surface Precipitation Model for the Sorption of Cations on Metal Oxides," *J. Colloid & Interface Sci.*, vol. 106, No. 1, pp. 226–242 (Jul. 1985).

James et al., "Adsorption of Hydrolyzable Metal Ions at the Oxide Water Interface", *J. Colloid & Interface Sci.*, vol. 40, No. 65, pp. 65–81 (Jul. 1972).

Wiese et al., "Adsorption of Al(III) at the $TiO_2$–$H_2O$ Interface", *J. Colloid & Interface Sci.*, vol. 51, No. 3, pp. 434–442 (Jun. 1975).

Kratohvil et al., Preparation and Properties of Coated, Uniform, Inorganic Colloidal Particles, Aluminum (hydrous) Oxide on Hematite, Chromia, and Titania, *Advanced Ceramic Materials*, vol. 2, No. 4 (Oct. 1987), pp. 798–803.

M. D. Sacks et al., "Thermal Decomposition of Spherical Hydrated Basic Aluminum Sulfate", *Ceramic Bulletin*, 63(2), 301 (1984).

J. E. Blendell et al., "High Purity Alumina by Controlled Precipitation from Aluminum Sulfate Solutions", *Ceramic Bulletin*, 63(6), 797 (1984).

N. F. Dyson, "New Phases in the System $Al_2O_3$–$SO_3$–$H_2O$ at Temperatures Above 100° C", *Nature*, 205, 385 (1965).

R. Brace, "Aluminum Hydrous Oxide Sols—I, Spherical Particles of Narrow Size Distribution", *J. Inorg. Nucl. Chem.*, 35, 3691 (1973).

C. Lo, "A Microcalorimetric Investigation of the Thermodynamics of Formation of the $HSO_4^{3-}$, $AlSO_4^{3-}$, and $Al(SO_4)_2^{3-}$ Ions in Aqueous Solutions at Temperatures Between 25 and 70° C", *Analytica Chimica Acta*, 139, 197 (1982).

J. W. Akitt, "Aluminium–27 Nuclear Magnetic Resonance Studies of Sulphato–complexes of the Hexa–Aquo Aluminium Ion", *J.C.S. Dalton*, 1226 (1972).

R. Wang, "The Crystal Structure of Alunite", *Acta Cryst.*, 18, 249 (1965).

*Primary Examiner*—Stevan A. Resan

[57] ABSTRACT

In one aspect, the present invention concerns a process of making coated magnetic particles. According to this process, an aqueous sol of amorphous, hydrolyzed, aluminous, colloidal particles is mixed with an aqueous suspension comprising magnetic particles. The amorphous, hydrolyzed, aluminous, colloidal particles have a mean particle size in the range from about 0.5 to about 5 nanometers and an average degree of hydrolysis in the range from 1.5 to about 3. During mixing, the amorphous, hydrolyzed, aluminous, colloidal particles form a continuous, amorphous, aluminum hydrous oxide coating on the magnetic particles, wherein the coating has an average thickness in the range from about 0.5 to about 5 nanometers. The present invention also concerns coated magnetic particles. Coated magnetic particles according to the present invention comprise a magnetizable core and a continuous, amorphous, aluminum hydrous oxide coating formed on the magnetizable core. The coating has an average thickness in the range from about 0.5 to about 5 nanometers. In another aspect, the present invention concerns a magnetic recording medium comprising a magnetic layer formed on a nonmagnetizable support. The magnetic layer comprises the coated magnetic particles described above dispersed in a polymeric binder.

12 Claims, No Drawings

MAGNETIC RECORDING MEDIA PREPARED FROM MAGNETIC PARTICLES HAVING AN EXTREMELY THIN, CONTINUOUS, AMORPHOUS, ALUMINUM HYDROUS OXIDE COATING

This is a division of application No. 07/818,852 filed Jan. 10, 1992 now U.S. Pat. No. 5,965,194.

FIELD OP THE INVENTION

The present invention relates to novel magnetic particles having improved dispersibility and orientability characteristics. More particularly, the present invention concerns novel magnetic particles which are coated with a continuous, amorphous, aluminum hydrous oxide coating. The present invention also concerns methods of making these coated magnetic particles as well as magnetic recording media incorporating such particles.

BACKGROUND OF THE INVENTION

Magnetic recording media generally comprise a magnetic layer coated on at least one side of a nonmagnetizable support. For particulate magnetic recording media, the magnetic layer comprises magnetic particles dispersed in a polymeric binder. The magnetic layer may also include other components such as lubricants; abrasives; thermal stabilizers; antioxidants; dispersants; wetting agents; antistatic agents; fungicides; bactericides; surfactants; coating aids; nonmagnetic particles; and the like.

The magnetic layer of a majority of conventional magnetic recording media is prepared by combining the magnetic particles, the polymeric binder, and other components (if any) with an organic solvent to form a dispersion. The dispersion is generally homogenized by lengthy mechanical milling to break up agglomerates of, and disperse, the magnetic particles. The resulting dispersion is then coated onto the nonmagnetizable support. The magnetic particles may then be magnetically oriented after which the coating may be dried, calendered, and/or cured.

The quality of the dispersion plays a vital role in determining the electromagnetic performance of the resulting magnetic recording medium. If the magnetic particles are insufficiently dispersed in the polymeric binder and other ingredients of the dispersion, electromagnetic and physical properties of the magnetic layer, such as the signal to noise ratio, squareness ratio, ability to reproduce short wavelengths, magnetic particle packing density, Young's modulus, surface smoothness, abrasion resistance, durability, and the like, tend to suffer dramatically.

Uniform dispersion of magnetic particles in the dispersion is very difficult to achieve, particularly when extremely fine, platelet-shaped magnetic particles, e.g., barium ferrite particles, are used. Organic dispersing agents have been used to facilitate the dispersing of the magnetic particles. However, due to the magnetic attractive forces between magnetic particles, there is a strong tendency for magnetic particles to reagglomerate in the dispersion when milling stops, even when organic dispersing agents are used. Additionally, the performance of organic dispersing agents at dispersing the extremely fine, platelet-shaped magnetic particles having a particle size of about 300 nm or less has been disappointing. To be effective at dispersing such particles, dispersing agents have had to be used in amounts that tend to weaken the adhesion of the magnetic layer to the nonmagnetic substrate, thus adversely affecting the abrasion resistance and durability of the medium. For these reasons, new technology for improving the dispersibility of magnetic particles is highly demanded.

Covering magnetic particles with an inorganic coating has been used to reduce the tendency of magnetic particles to agglomerate or aggregate. For example, U.S. Pat. No. 4,707,593 describes a visible image magnetic card in which magnetic particles and a fine fluidizing powder are combined in a display cell. A portion of the fluidizing powder covers the surfaces of the magnetic particles. The fluidizing powder reduces the adhesion and friction coefficient between the magnetic particles. The fine fluidizing powder is selected from materials which may include aluminum oxide.

U.S. Pat. No. 4,438,156 describes a method for coating magnetic particles with colloidal silica particles. To prepare the coated magnetic particles, the magnetic particles are mixed with an acid at a pH such that the magnetic particles have a significant, positive electrostatic charge. The pH of a slurry of the colloidal silica particles is adjusted so that the colloidal silica particles have a significant, negative electrostatic charge. When the slurry of colloidal silica particles is added to the acidic mixture of magnetic particles, the colloidal silica particles with their negative electrostatic charge are attracted to and coat the magnetic particles with their positive electrostatic charge.

U.S. Pat. No. 5,039,559 describes coating magnetic particles with inorganic oxides, which may include aluminum oxide. The particles either are superparamagnetic or have a low Curie point such that the particles have low permanent magnetization. The coated particles are prepared by emulsifying an aqueous solution or dispersion of magnetic material and an aqueous solution or sol of the inorganic oxide in an inert, water-immiscible liquid. The aqueous droplets that form are gelled, recovered, and heated at 250° C. to 2000° C. The coating is continuous and covers the entire surface of the particle core to prevent exposure of the core to the surrounding media. The coated particles typically have a magnetic material content of below 50% by weight. Example 7 of U.S. Pat. No. 5,039,559 describes an $Al_2O_3$/$LiFe_5O_8$ coating having a thickness of 10 nanometers.

U.S. Pat. No. 4,400,432 describes treated, ferromagnetic iron oxide particles in which the particles are coated with one layer of oxygen-containing anions and a further layer of polyvalent cations. The polyvalent cation layer may be applied between two oxygen-containing anion layers. The materials used to form the layers include water-soluble aluminum salts.

U.S. Pat. No. 4,229,234 describes the preparation of passivated particulate high Curie temperature magnetic alloys. An element, such as aluminum, is alloyed with iron, cobalt, or nickel. The alloy is then formed into particles, and the particles are then exposed to controlled amounts of oxygen at elevated temperature over selected time periods. An oxide of the element forms and diffuses to the surface of the particles to form a film. The films typically have a thickness in the range from 0.1 to 0.5 $\mu$m.

U.S. Pat. No. 4,512,682 describes the formation of insulating layers comprising alternating layers of alumina and silica coated on a ferrite substrate.

U.S. Pat. No. 4,336,310 describes silica coated metallic magnetic powders and their use in recording media, which have further layers of silanes and oleic acid coated thereon.

U.S. Pat. Nos. 4,133,677, 4,280,918, 4,309,459 and 4,321,303 describe iron oxide fine powders having a silica layer formed on the surface thereof.

U.S. Pat. No. 3,535,245 describes metal oxide coated ferromagnetic particles prepared by a microgel process involving epoxy materials, an alumina gel, and ferromagnetic particles.

U.S. Pat. No. 4,944,802 describes the use of barium ferrite pigment particles in combination with inorganic oxide particles dispersed in a binder. The inorganic oxide particles are used as an abrasive and are not used to coat the barium ferrite pigment particles.

Japanese Kokai No. 1-119,519 describes magnetic particles coated with a layer of hydrated alumina with a boehmite structure. A coupling agent layer is then further deposited onto the surface of the coated particles.

Similarly, Japanese Kokai No. 1-176,229 describes magnetic particles having hydrated alumina shells composed of boehmite particles that are further overcoated with a layer of silica. It also describes magnetic recording media containing such coated particles.

Japanese Kokai No. 61-222,207 describes magnetic particles coated with aluminum oxide alumina sol shells useful in compression molding of magnetic objects. The aluminum oxide shell thicknesses were in the range of 1 to about 10 microns, with the thicker layers being preferred.

WIPO published patent application 90-15,364 describes a process for making non-smearable colored magnetic particles that comprises the steps of providing magnetic core particles of metal or reducible metal oxide 1–50 microns in size, depositing submicron particles of a non-reducible oxide of a different metal on the core particles, heating the aggregate particles in an oxygen-containing atmosphere to oxidize the surface of the core particles, and heating the particles sufficiently in an inert atmosphere to cause reaction between the core surface oxide and the deposited oxide, thus forming the surface colored magnetic core particles.

U.S. Pat. No. 2,085,129 describes the production of colloidal metal hydroxides. The colloidal metal hydroxides can be obtained by causing salts of trivalent metals, e.g., aluminum, to act in approximately stoichiometrical ratio on agents that decompose the salts to form hydroxides. The sols obtained by this process, e.g., alumina sols, are described as being useful as protective colloids (See page 4, first column, lines 33–40).

The adsorption of a polynuclear cation or positively charged colloid onto another positively charged colloid has been described in (a) "A Surface Precipitation Model for the Sorption of Cations on Metal Oxides", Farley, K. J.; Dzombak, D. A.; Morel, F. M. M. *J. Colloid Interface Sci.* 1985, 106, 226; (b) "Adsorption of Al(III) at the $TiO_2$-$H_2O$ Interface", Wiese, G. R.; Healy, T. W. *J. Colloid Interface Sci.* 1975, 51, 434; and (c) "Adsorption of Hydrolyzable Metal Ions at the Oxide-Water Interface", James, R. O.; Healy, T. W. *J. Colloid Interface Sci.* 1972, 40, 65.

Some of these prior art techniques rely on crystalline materials, e.g., boehmite and pseudoboehmite, to coat magnetic particles. Crystalline coating materials, however, tend to provide coatings that are discontinuous and/or too thick. With a discontinuous coating, only part of the surface of the magnetic particles is covered by the coating materials. Unless the particles are further coated by layers of additional coating materials, discontinuous coatings provide particles having two different surfaces which must be wetted in order to disperse the particles. Discontinuous coatings, therefore, provide magnetic particles that are more difficult to disperse than particles having only a single kind of surface for wetting. When the coating is too thick, e.g., having a thickness of greater than 5 nm, the tendency of the magnetic particles to form aggregates may be reduced. However, the packing density of the magnetic particles is also significantly reduced. In view of this reduction in packing density, magnetic particles having such thick coatings would be less suitable for high density magnetic recording applications relative to magnetic particles having thinner coatings.

Other prior art techniques rely on gelation to coat the magnetic particles and are capable of providing continuous coatings. However, such coatings tend to coat large agglomerates of particles rather than individual particles and also tend to provide coatings that are too thick.

Other prior art techniques depend upon electrostatic attraction between the coating materials and the magnetic particles to achieve coating. This approach, however can only be used with certain kinds of magnetic particles having the proper surface charge characteristics. Moreover, this approach often requires a pH change to achieve coating. Changing the pH to achieve coating may destabilize the aqueous magnetic suspension and can cause poor quality, thick coatings to form on the magnetic particles. This approach can also degrade the magnetic properties of the magnetic particles.

Other miscellaneous coating techniques have also been described. What is needed in the art, however, are improved coating techniques that allow thin (i.e., 5 nm or less), continuous coatings to be formed on any kind of magnetic particle, regardless of its surface charge characteristics and without requiring gelation or a pH change to effect such coating.

SUMMARY OF THE INVENTION

It has now been discovered that substantial improvements in dispersibility and orientability of magnetic particles can be achieved by forming a continuous, amorphous coating on the magnetic particles, wherein the coating is derived from amorphous, hydrolyzed, aluminous, colloidal particles. Advantageously, the affinity of the amorphous, hydrolyzed, aluminous, colloidal particles for magnetic particles is so strong that the coating can be formed on any kind of magnetic particle, regardless of its surface charge characteristics. Once formed, the coating is thick enough to reduce the tendency of the magnetic particles to agglomerate yet, at the same time, is thin enough to allow high packing densities of the coated magnetic particles to be achieved.

Magnetic recording media incorporating the coated magnetic particles of the present invention are characterized by improved electromagnetic performance. For example, magnetic recording media incorporating the coated magnetic particles of the present invention show higher remanence values and higher squareness values as compared to magnetic recording media incorporating the corresponding uncoated magnetic particles. Moreover, the coated magnetic particles of the present invention are more uniformly dispersible in polymeric binders than the corresponding uncoated particles, and the viscosity of magnetic dispersions containing the coated magnetic particles of the present invention is significantly lower than that of magnetic dispersions containing the corresponding uncoated magnetic particles. Additionally, magnetic layers of the present invention tend to have higher gloss values as compared to magnetic layers containing the corresponding uncoated particles.

In one aspect, the present invention concerns a process of making coated magnetic particles. According to this process, an aqueous sol of amorphous, hydrolyzed, aluminous, colloidal particles is mixed with an aqueous suspension comprising magnetic particles. The amorphous, hydrolyzed, aluminous, colloidal particles have a mean particle size in the range from about 0.5 to about 5 nanometers and an average degree of hydrolysis in the range from 1.5 to about 3. During mixing, the amorphous, hydrolyzed, aluminous, colloidal particles form a continuous, amorphous, aluminum hydrous oxide coating on the magnetic particles, wherein the coating has an average thickness in the range from about 0.5 to about 5 nanometers.

The present invention also concerns coated magnetic particles. Coated magnetic particles according to the present invention comprise a magnetizable core and a continuous, amorphous, aluminum hydrous oxide coating formed on the magnetizable core. The coating has an average thickness in the range from about 0.5 to about 5 nanometers.

In another aspect, the present invention concerns a magnetic recording medium comprising a magnetic layer formed on a nonmagnetizable support. The magnetic layer comprises the coated magnetic particles described above dispersed in a polymeric binder.

DESCRIPTION OF THE PREFERRED EMBODIMENTS

The coated magnetic particles of the present invention may be prepared by mixing an aqueous sol of amorphous, hydrolyzed, aluminous, colloidal particles with an aqueous suspension of magnetic particles. The aqueous suspension of magnetic particles (hereinafter also referred to as the "aqueous magnetic suspension") may be prepared by mixing magnetic particles with an amount of water sufficient to wet the entire surface of the magnetic particles. Using 1 to 50, and preferably 10 to 40, weight percent magnetic particles in water based on the total weight of the aqueous magnetic suspension has been found to be suitable in the practice of the present invention. The aqueous magnetic suspension is preferably mixed under high shear in order to momentarily disrupt the magnetic attraction between the magnetic particles.

In the practice of the present invention, any kind of magnetic particle may be used to prepare the aqueous magnetic suspension. Preferred magnetic particles are those which are suitable for magnetic recording applications. Examples of such particles include ferric oxides such as $\gamma$-$Fe_2O_3$, $\gamma$-$Fe_3O_4$; $\delta$-FeOOH; cobalt-modified ferric oxides; hexagonal, platelet-shaped magnetic ferrite particles having an easy axis of magnetization perpendicular to the plane of the particles such as barium ferrite, strontium ferrite, substituted barium ferrite, and the like; chromium dioxide; and fine metal magnetic particles such as Fe and Fe alloy particles such as Fe-Ni, Fe-Co, Fe-Ni-Co, and the like. Of these magnetic particles, chromium dioxide is characterized by a negative surface charge when dispersed in water, whereas the other magnetic particles are characterized by either a positive surface charge or negative surface charge when dispersed in water.

Most, if not all, uncoated magnetic particles have an oxide-containing surface layer. It is believed that this oxide-containing surface layer facilitates the reaction between the magnetic particles and the amorphous, hydrolyzed, aluminous, colloidal particles.

Optionally, the aqueous magnetic suspension may comprise an electrolyte in order to control the ionic strength of the aqueous magnetic suspension so as to provide uniformity in product processing from batch to batch. Examples of electrolytes suitable in the practice of the present invention include potassium nitrate, potassium chloride, lithium chloride, ammonium chloride, and the like. The concentration of the electrolyte is not critical, and concentrations of from more than 0 M up to about 0.1 M would be suitable in the practice of the present invention. Most preferably, the electrolyte is potassium nitrate used at a concentration of about 0.001 M. Although it is not necessary to adjust the pH of the aqueous magnetic suspension before mixing with the aqueous sol, an acid or base may optionally be added to the magnetic dispersion in order to remove organic impurities from the surfaces of the magnetic particles.

The aqueous sols suitable in the practice of the present invention advantageously comprise amorphous, hydrolyzed, aluminous, colloidal particles (hereinafter also referred to as "colloids"). As used herein, the term "amorphous" means that the X-ray diffraction pattern of a dried sample of the material, dried at room temperature, shows no sharp diffraction maxima and no diffraction maxima coincident with diffraction maxima observed for corresponding crystalline materials. The amorphous colloids of the present invention typically contain both octahedral and tetrahedral aluminum. The relative ratio of the octahedral and tetrahedral aluminum can be determined by $^{27}Al$ NMR analysis. See, for example, T. E. Wood et al., *Mat. Res. Soc. Symp. Proc.* 1990, 180, p. 97–115.

The amorphous character of the colloids allows continuous amorphous coatings to be formed around the entire surfaces of the magnetic particles. The term "continuous" means that, according to TEM analysis at a magnification of 200,000×, (1) the coating covers substantially all of the surface of the magnetic particles, and (2) even though the coating may have some texture, the coating is substantially nongranular in appearance.

Advantageously, the continuous coatings of the present invention ensure that the surface characteristics of the magnetic particles are predominantly basic in nature. As a result, the coated magnetic particles have more consistent wettability characteristics and provide more stable dispersions as compared to the corresponding uncoated magnetic particles. Moreover, because the entire surface of the magnetic particles is coated, the magnetic recording tape formulations of the present invention only have to wet one kind of pigment surface, regardless of the surface nature of the uncoated particles. This greatly simplifies the formulation effort that would be needed to disperse different kinds of magnetic particles and allows the facile blending of different kinds of magnetic particles in only one kind of magnetic tape formulation.

The term "aluminous" means a polynuclear complex or colloid generated by the hydrolysis of an aluminum species. The hydrolysis of metal ions has been described, for example, in Baes and Mesmer, *The Hydrolysis of Cations,* E. Krieger Publishing Co., Florida, page 1 (1986); and T. E. Wood et al, *Mat. Res. Soc. Symp. Proc.* 1990, 180, pages 97–115.

The average degree of hydrolysis of the colloids can be determined by reacting the aqueous sol with an excess of a strong acid in order to convert the colloids into the hexaquoaluminum $(3^+)$ ion, $[Al(OH_2)_6]^{3+}$. The average degree of hydrolysis is then given by the ratio $$\frac{H_c^+}{Al},$$

wherein $H^+_c$ is the moles of $H^+$ ions consumed in the digestion of the colloids, and Al is the total moles of aluminum in the solution. The total moles of aluminum, Al, can be determined by analytical methods known in the art, for example, inductively coupled plasma (ICP) spectroscopic analysis. The moles of $H^+$ ions consumed in the digestion of the colloid, $H^+_c$, is given by the expression $$H^+_c = H^+_A + H^+_H - [H^+_{SOLN}]V$$

wherein $H^+_A$ is equal to the moles of $H^+$ ions added to the solution in the form of strong acid; $H^+_H$ is equal to the moles of $H^+$ ions generated by the partial hydrolysis of the $[Al(OH_2)_6]^{3+}$ ion; $[H^+_{SOLN}]$ is the concentration of $H^+$ ions in the solution in moles per liter; and V is the volume of the solution in liters. $H^+_A$ can be readily calculated from the amount of strong acid added to the aqueous sol. $H^+_H$ is generally negligible and is assumed to be O. $[H^+_{SOLN}]$ is given by the expression antilog (−P), wherein P is the pH of the solution after addition of the strong acid and complete digestion of the colloids.

Preferred colloids of the present invention have an average degree of hydrolysis in the range from 1.5 to 3.0, and more preferably 2.5 to 3.0. If the average degree of hydrolysis is too low, then the tendency to adsorb and coat the particles is reduced. On the other hand, if the average degree of hydrolysis is too high, then the colloids are unstable and can agglomerate and grow undesirably large before coating the magnetic particles. It must be emphasized that, in practice, the degree of hydrolysis of individual colloids will vary within the population of colloids. A completely hydrolyzed colloid would be characterized by a degree of hydrolysis equal to 3.

Advantageously, as a result of their hydrolyzed character, the colloids of the present invention are extremely reactive. As a result, even though the colloids typically may have a positive surface charge, the colloids will coat any kind of aqueously dispersed magnetic particles, regardless of whether the aqueously dispersed magnetic particles have a positive or negative surface charge. Importantly, when the aqueous sol is mixed with the aqueous, magnetic suspension, the colloids coat the magnetic particles without the necessity of a pH change to effect such coating. This is advantageous, because changing the pH to effect coating can destabilize the aqueous magnetic suspension and cause poor quality coatings to form on the particles that are too thick. A change in the pH can also degrade the magnetic properties of the magnetic particles.

The colloids of the present invention have a mean particle diameter of from 0.5 nm to 5 nm, and more preferably about 2 nm. The thickness of the coating that forms on the magnetic particles will be approximately the same as the mean particle diameter of the colloids. The mean particle diameter of the colloids can be determined by transmission electron microscopy or by low angle light scattering techniques. Light scattering techniques have been described, for example, in J. K. Ruff et al., *J. Am. Chem. Soc.* 1958, 80, 1523.

Preferred aqueous sols of the present invention comprise 0.5 to 15, and more preferably 2 to 5 weight percent of the colloids. The lower concentrations are more preferred, because the colloids tend to gel more readily at higher concentrations.

Aqueous sols useful in the practice of the present invention may be prepared by the controlled hydrolysis of a dilute solution of a basic aluminum salt. The basic aluminum salt can be prepared by a variety of procedures. For example, the basic aluminum salt can be prepared by digesting aluminum metal in an aluminum chloride or hydrochloric acid solution wherein the ratio of the aluminum atoms to chloride atoms is about 2. Other counterions such as nitrate, iodide, or bromide ions may be substituted for the chloride ions. The use of chloride ions is preferred, however, because the chloride facilitates the digestion of the aluminum metal and stabilizes the later formed colloids against conversion to boehmite or other, larger colloidal species. The resulting basic aluminum salt at this point typically has an average degree of hydrolysis of 2 to 2.5. The basic aluminum salt may be further hydrolyzed to form the colloids by ion exchanging hydroxide ion or bicarbonate ion for a portion of the anions. Such ion exchange techniques are described, for example, in U.S. Pat. Nos. 2,438,230 and 3,098,044. Preferably, the further hydrolysis of the basic aluminum salt is carried out in dilute solutions having an alumina concentration of 2 percent by weight or less, because the basic aluminum salt is most controllably hydrolyzed at such low concentrations. After the colloids are formed, the concentration of the colloids may be raised, if desired, by any suitable method known in the art, e.g., evaporation or ultrafiltration techniques.

It has now been discovered that aqueous sols of the present invention may also be conveniently, reproducibly, economically, and quickly prepared by a hydrolysis reaction in which a basic aluminum salt is reacted directly with a solution of a mild base such as ammonium bicarbonate. According to this approach, a dilute solution of a basic aluminum salt such as a basic aluminum chloride or a basic aluminum nitrate is directly reacted with a dilute solution of a mild base. In practice, the basic aluminum salt is diluted or, in the case of a solid basic aluminum salt, dissolved in an aqueous solution to yield a solution that, after the addition of the mild base, will be less than 5 weight percent alumina, preferably less than 2.5 weight percent alumina and most preferably about 1 weight percent alumina or less. The concentration of the basic aluminum salt before the addition of the mild base will be less than 10 weight percent alumina and most preferably less than 2 weight percent alumina. Higher concentrations of the basic aluminum salt can gel during reaction with the mild base. In addition, the final sol is found to be more uniform when the reaction is carried out with a dilute basic aluminum salt solution, for example with a solution that is about 2% by weight alumina or less. It is important to note that the dilution of a basic aluminum salt solution, and the dissolution of a solid basic aluminum salt, in neutral or near neutral water induces a small amount of hydrolysis of the basic aluminum salt. Before reacting the basic aluminum salt solution with the mild base solution, this basic aluminum salt solution can optionally be prehydrolyzed by heating the basic aluminum salt solution at a temperature in the range from 30° C. to about 130° C. This optional heating step should be sufficiently brief, for example 1 minute to 2 hours, so as not to cause precipitation of boehmite or other crystalline species from the sol.

The basic aluminum salt solution is reacted with a mild base solution to raise the average degree of hydrolysis. The amount of mild base solution that is added depends upon the concentration of the basic aluminum salt solution. For example, if the concentration of the basic aluminum salt solution is 1 weight percent alumina, using 0.1 moles of mild base per mole of aluminum has been found to be suitable to generate an aqueous sol of the present invention. If the concentration of the basic aluminum salt is 3 weight percent alumina, using 0.2 moles of mold base per mole of aluminum has been found to be suitable in the practice of the present invention. After the formation of the colloids, the pH of the aqueous sol typically is in the range from 4 to 8, preferably 4 to 5.5.

The mild base is added in solution form and is sufficiently dilute so as not to gel or flocculate the basic aluminum salt. Concentrations in the range from about 0.03 M to 0.25 M have been found to be suitable in the practice of the present invention. The mild base solution and the basic aluminum salt solution can be reacted by mixing at room temperature or at a slightly elevated temperature, e.g., at about 50° C. However, in some cases, there is an advantage to reacting the solutions with mixing at a lower temperature, for example 4° C. to 10° C., and then allowing the resulting reaction mixture to warm up to promote the acid-base reaction. In this fashion, the solutions are allowed to mix more homogeneously before the reaction occurs. For example, a solution of aluminum chlorohydrate at a concentration of 2 weight percent alumina held at 4° C. can be mixed with rapid stirring with an equal volume of a 0.12 molar ammonium bicarbonate solution also at 4° C. and gently warmed over a 30-minute period to room temperature to yield a clear, aqueous sol. When the identical reaction is carried out at room temperature, a more turbid, slightly gelled aqueous sol may result.

The most preferred mild base is ammonium bicarbonate. Ammonium bicarbonate produces colloids that are stabilized by an ammonium chloride buffer. Other mild bases such as ammonium hydroxide, ammonium carbonate, sodium bicarbonate and sodium carbonate can be used, particularly in cases where the basic aluminum salt solution is more dilute.

The mixing of the basic aluminum salt solution and the mild base solution should be carried out under conditions of high shear or agitation so as to promote rapid mixing of the two solutions. Such methods are well known to those skilled in the art. After mixing is completed, the reaction mixture is preferably heated at 30° C. to about 100° C. to hasten the completion of the acid-base reaction. The resulting aqueous sols are water clear to very slightly turbid in appearance. The most preferred product is an aqueous sol that is water clear in appearance and that has a pH of about 5.

The resulting aqueous sol can be used as prepared to coat and disperse magnetic particles or it can be concentrated prior to use. Like the sols of the prior art, these colloids can be concentrated by any suitable method known to those skilled in the art, e.g., evaporation or ultrafiltration techniques. Advantageously, because the amount of mild base used and the anion content in the starting basic aluminum salt solution is low, the resulting colloids are surprisingly stable and can be concentrated without requiring an expensive deionization step to be concentrated. In addition, the simple preparation method disclosed herein allows generation of colloids without requiring the use of ion exchange techniques. The ion exchange process is expensive and slow.

Generally, the colloids will have a positive surface charge when the pH of the aqueous alumina sols of the present invention is below a value of about 9 to 9.5. Optionally, a buffer may also be added to the aqueous alumina sol in order to help stabilize the pH. It is unnecessary in the practice of the present invention to adjust the pH of the aqueous sol before the aqueous sol is mixed with the aqueous magnetic dispersion.

Examples of commercially available aqueous sols useful in the practice of the present invention include Nalco 8676 brand alumina sol and Nalco 1SJ 614 brand alumina sol (Nalco Corporation, Naperville, Ill.). Nalco 8676 brand alumina sols are aqueous sols having a pH of about 4.3 which comprise amorphous, hydrolyzed, aluminous colloidal particles at a concentration of about 10 weight percent alumina solids. Nalco 1SJ 614 brand alumina sols are aqueous sols having a pH of about 5.1 which comprise amorphous, hydrolyzed, aluminous, colloidal particles at a concentration of about 10 weight percent alumina solids.

The aqueous sol is mixed with the aqueous magnetic suspension, whereby the colloids coat the magnetic particles. Mixing facilitates the reaction between the colloids and the magnetic particles. Preferably such mixing is vigorous, high shear mixing. In some previously known processes, it had also been necessary to adjust the pH of the admixture in order to cause the coating material to coat the magnetic particles. However, in the practice of the present invention, it is unnecessary to adjust the pH of the admixture. Advantageously, in the process of the present invention, as mixing takes place, the reactive colloids quickly coat the magnetic particles without requiring any change in pH.

The reaction product resulting from mixing the aqueous sol with the aqueous magnetic suspension is an admixture comprising a liquid portion and coated magnetic particles, said particles comprising a continuous, amorphous, aluminum hydrous oxide coating formed around a magnetic core. Preferably, the magnetic core is an individual magnetic particle, but the magnetic core may also comprise a plurality of magnetic particles. The term "aluminum hydrous oxide" means an amorphous solid comprising aluminum, oxygen, and hydrogen atoms. Preferably, the aluminum is bound to oxide ions, hydroxide ions, and/or water molecules. This solid may also contain other counterions and impurities such as chloride, ammonium, sulfate, sodium, and nitrate ions.

As an alternative reaction scheme for preparing coated magnetic particles of the present invention, magnetic particles and a basic aluminum salt are combined in deionized water with mixing. Coated magnetic particles of the present invention form in the resulting admixture.

Whatever the technique used to coat the magnetic particles, the admixture comprising the coated magnetic particles and the liquid portion may optionally be heat treated in order to enhance the bonding between the amorphous, aluminum hydrous oxide coating and the magnetic particles. Heat treating may occur at a temperature greater than 25° C. but less than the boiling point of the admixture for a period from 1 minute to 24 hours. Preferably, heat treating occurs at a temperature of about 95° C. for a period in the range from 30 minutes to four hours.

Depending upon the intended use of the coated magnetic particles, the coated magnetic particles may be separated from the liquid portion of the admixture after which the liquid portion of the admixture may be discarded. The particular technique used to separate the coated magnetic particles from the admixture is not critical and may be accomplished using a variety of solid/liquid separation techniques. Such techniques include, for example, spray drying, drying in an oven, centrifugation, decanting excess liquid, filtering, separation in a magnetic field, and the like. Combinations of such techniques may also be used.

As one example of a technique for separating the coated magnetic particles from the liquid portion of the admixture, the admixture is first diluted with an equal volume of deionized water. After diluting the admixture, the coated particles are settled, and then excess liquid is decanted. This dilution and decantation may be repeated one or more times. After the last wash, the remaining admixture is filtered to collect the coated magnetic particles, and the coated magnetic particles are then dried. Preferably, drying occurs in a vacuum at a temperature in the range from 110° C. to 125° C. Such drying further enhances bonding between the amorphous, aluminum hydrous oxide coating and the magnetic particles. The dried particles may then be pulverized to provide a very fine powder of the coated magnetic particles.

Coated magnetic particles of the present invention have less of a tendency to agglomerate than uncoated magnetic particles. Agglomeration is caused, in part, by the magnetic attraction between magnetic particles. Because the magnetic attraction between two magnetic particles varies inversely to the third power of the physical separation between the dipoles, the magnetic attraction between two particles decreases rapidly as the separation between the particles increases. When two coated magnetic particles approach each other, there will be a physical separation of at least two coating thicknesses between the particles. Due to this separation, magnetic attraction between coated magnetic particles is dramatically reduced.

According to the present invention, the continuous, amorphous, aluminum hydrous oxide coating has a thickness in the range from about 0.5 to 5 nanometers, and more preferably about 2 nm. Such coatings provide an optimum balance between reducing the magnetic attraction between particles while, at the same time, maximizing the packing density of the particles in a magnetic layer. The thickness of the coating can be determined by transmission electron microscopy ("TEM").

The coated magnetic particles of the present invention are particularly suitable for use in magnetic recording media. Magnetic recording media according to the present invention comprise a magnetizable layer formed on a nonmagnetizable support. The nonmagnetizable support may be any suitable support material known in the art. Examples of suitable substrate materials include, for example, polyesters such as polyethylene terephthalate ("PET"); polyolefins such as polypropylene; cellulose derivatives such as cellulose triacetate or cellulose diacetate; polymers such as polycarbonate, polyvinyl chloride, polyimide, polyphenylene sulfide, polyacrylate, polyether sulphone, polyether ether ketone, polyetherimide, polysulphone, aramid film, polyethylene 2,6-naphthalate film, fluorinated polymer, liquid crystal polyesters, polyamide, or polyhydric acid; metals such as aluminum, or copper; paper; or any other suitable material. The support typically may have a thickness in the range from 1 micron to 1 cm, although thicker or thinner substrates could also be used if desired.

The magnetizable layer comprises the coated magnetic particles of the present invention dispersed in a binder. The magnetizable layer of the present invention preferably comprises from about 50 to 95, preferably about 65 to 90, and more preferably about 70 to 85 percent by weight of the coated magnetic particles. The percent by weight of coated magnetic particles is based on the total weight of the magnetizable layer. The magnetizable layer typically may have a thickness in the range from 0.01 micron to 100 micron.

In the practice of the present invention, the magnetizable layer may comprise any suitable binder known in the art. Preferably, the binder comprises a polyurethane polymer having pendant acidic or ionic moieties. Such moieties include, for example, groups selected from $-SO_3M$, $-OSO_3M$, $-COOM$, $-PO(OM')_2$, quaternary ammonium groups, and OH, wherein M is hydrogen, Na, K, Li, or ammonium, and M' is hydrogen, Na, K, Li, ammonium, or a lower alkyl group. Polyurethanes having such groups are described, for example, in U.S. Pat. Nos. 5,071,578; 4,876, 149; 4,837,082; 4,784,914; and 4,152,485. Polyurethanes having such groups are characterized by high pigment loading capabilities and provide magnetizable layers with improved electromagnetic output and improved signal to noise ratio. Magnetizable layers prepared with such binders are also characterized by an excellent balance of mechanical properties, such as durability, coefficient of friction, stiffness, Young's modulus, surface hardness, and resilience.

Preferably, the binder of the present invention also contains a hard resin component in an amount from 1 to 95 weight percent based on the total weight of the hard resin component and the polyester or polyurethane having hydrophilic groups. Examples of such hard resin components are well known in the art and include the various phenoxy resins, vinyl chloride copolymers, nitrocellulose, and the like. Preferred hard resin components are the vinyl chloride copolymers having pendant epoxy groups and at least one kind of pendant acidic or ionic moieties. Such moieties include, for example, groups selected from $-SO_3M$, $-OSO_3M$, $-COOM$, $-PO(OM')_2$, quaternary ammonium groups, and OH, wherein M is hydrogen, Na, K, Li, or ammonium, and M' is hydrogen, Na, K, Li, ammonium, or a lower alkyl group. Specific examples of preferred hard resin components are the hydroxy, sulfonate, and epoxy functional vinyl chloride copolymers available under the tradenames MR-110 (OH equivalent weight of 3400 g/equiv, sulfonate equivalent weight of 13000 g/equiv, epoxy equivalent weight of 1600 g/equiv, glass transition temperature of 59° C., and number average molecular weight of 43,400), MR-113 (OH equivalent weight of 2400 g/equiv, sulfonate equivalent weight of 11000 g/equiv, epoxy equivalent weight of 2100 g/equiv, glass transition temperature of 62° C., and number average molecular weight of 50,200), and MR-120 (OH equivalent weight of 1890 g/equiv, sulfonate equivalent weight of 19,200 g/equiv, epoxy equivalent weight of 5400 g/equiv, glass transition temperature of 65° C., and number average molecular weight of 30,000) from Nippon Zeon Co., Japan.

Particularly preferred binders comprise a hydroxy and sulfonate functional polyurethane and a hydroxy, sulfonate, and epoxy functional vinyl chloride copolymer. Such binders are described in U.S. Pat. No. 5,069,807.

In addition to the binder and the coated magnetic particles, the magnetizable layer of the present invention may also comprise one or more conventional additives such as lubricants; abrasives; thermal stabilizers; antioxidants; dispersants; wetting agents; antistatic agents; fungicides; bactericides; surfactants; coating aids; nonmagnetic pigments; and the like in accordance with practices known in the art.

In preparing the magnetic recording media of the present invention, the components of the magnetizable layer are combined with a suitable solvent to prepare a dispersion which is then coated onto the nonmagnetizable support. Examples of suitable solvents may include ketones such as acetone, methyl ethyl ketone ("MEK"), methyl isobutyl ketone, or cyclohexanone; alcohols such as methanol, ethanol, propanol, or butanol; esters such as methyl acetate, ethyl acetate, butyl acetate, ethyl lactate, or glycol diacetate; water-based systems; tetrahydrofuran; glycol ethers such as ethylene glycol dimethyl ether, or ethylene glycol monoethyl ether; dioxane or the like; aromatic hydrocarbons such as benzene, toluene, or xylene; aliphatic hydrocarbons such as hexane or heptane; nitropropane or the like; and mixtures thereof.

The dispersion may be applied to the support using any conventional coating technique, such as extrusion coating techniques, reverse roll coating techniques, spin coating techniques, gravure coating techniques or knife coating techniques. The coated support may then be passed through a magnetic field to orient the coated magnetic particles, after which the binder is dried and cured, if necessary.

The invention will now be further described with reference to the following examples. The term "TEM" used throughout the following examples refers to Transmission Electron Microscopy, and the term "parts" means parts by weight.

EXAMPLE 1

This example demonstrates the preparation of alumina coated barium ferrite particles.

An aqueous magnetic suspension was prepared by adding 125 g of uncoated barium ferrite pigment (Toda ΣT 50125, a 50 m$^2$/g Ni-Ti doped pigment having 1250 Øe powder coercivity, 15×50 nm nominal particle size) to 220 g of 0.001 M aqueous potassium nitrate solution. Aqueous sodium hydroxide (1 M) was added to the aqueous magnetic suspension with stirring at a high shear rate until a pH of 8 was obtained. The resulting suspension was then milled in an Igarashi ball mill for 2 hours at 2500 rpm using 1.3 mm diameter steel balls to disrupt the magnetic attraction between the barium ferrite particles. Next, 25 g of Nalco 8676 aqueous sol was added to the magnetic dispersion. Coated magnetic particles were formed. The resultant admixture was milled for 1 hour. The admixture was then heated to 95° C. for 30 minutes, resulting in an admixture that was very smooth in appearance and that remained unchanged in appearance even if allowed to stand for several days. To wash the coated magnetic particles, an equal volume of deionized water was added to the admixture, and the supernatant liquid was decanted. This washing process was repeated three additional times. The coated magnetic particles were then collected by filtration and dried in vacuo for 4 hours at 110° C. The resultant final powder consisted of barium ferrite particles covered with a continuous amorphous, aluminum hydrous oxide coating having a thickness of about 2 nm.

The bulk magnetic properties of the coated barium ferrite particles were compared to those of the uncoated barium ferrite particles using a vibrating sample magnetometer (VSM) at a field strength of 12.8 kØe and are listed in Table 1.

TABLE 1

| Pigment | Moment (emu/g) | Hc (Øe) | Wt % | | | | | | | |
|---|---|---|---|---|---|---|---|---|---|---|
| | | | Fe | Al | Ba | Zn | Ti | Ni | Mn | Mg | S |
| Uncoated barium ferrite | 59.75 | 1175 | 51.45 | 0.03 | 7.36 | 3.62 | 1.40 | 4.24 | 0.63 | 0.36 | 0.06 |
| Coated barium ferrite | 58.56 | 1185 | 50.28 | 1.65 | 6.46 | 3.40 | 1.36 | 4.12 | 0.56 | 0.36 | 0.10 |

The electrokinetic properties of the coated barium ferrite were compared to those of the uncoated barium ferrite. The uncoated barium ferrite showed an amphoteric surface with an isoelectric point of about 6.9. In contrast, the coated barium ferrite showed a predominantly basic surface with an isoelectric point of about 9.3. Furthermore, in the pH range from 4 to 9, the zeta potential (ζ) of the coated barium ferrite was positive and much higher than that of the uncoated barium ferrite. This indicates that the basic site density of the coated barium ferrite was very large compared to that of the uncoated barium ferrite. In addition, the zeta potential curve for the coated barium ferrite was almost identical to that of an amorphous alumina surface. This confirmed that the surface of barium ferrite had been substantially covered by the hydrolyzed, amorphous, aluminous, colloidal particles.

EXAMPLE 2

This example describes the preparation of magnetic recording media using the coated and uncoated barium ferrite particles of Example 1. Magnetic formulations were prepared from the following ingredients in the following amounts:

| | Formulation A | Formulation B |
|---|---|---|
| Coated barium ferrite pigment | 100 parts | 100 parts |
| Polyurethane resin | 18 parts | 18 parts |
| Methyl ethyl ketone | 105 parts | 85 parts |
| Cyclohexanone | 53 parts | 43 parts |
| Toluene | 18 parts | 14 parts |

The polyurethane resin had been prepared by condensation polymerization of polycaprolactone diol, 5-amino-1,2,4-dithiazole-3-thione, neopentyl glycol, methylenediphenyl-diisocyanate (MDI), polycaprolactone triol in the ratio (33:3:9:35:20 parts by weight). It had a weight average molecular weight of about 20,000, a 5-amino-1,2,4-dithiazole-3-thione equivalent weight of 10,000, and hydroxyl equivalent weight of about 1,500.

Using the above-listed ingredients, a dispersion of each formulation was prepared by adding cyclohexanone to the pigment and milling with 200 g of 1.3 mm steel balls in a Red Devil™ shaker (Red Devil, Inc., Union, N.J.) for 20 minutes. Next, the polyurethane resin was added along with the methyl ethyl ketone and toluene, and the dispersion milled for an additional 30 minutes.

For comparison purposes, two additional dispersions were prepared using these same materials and procedures, except that the corresponding uncoated barium ferrite particles were substituted for the coated barium ferrite particles. Table 2A compares the viscosities of the dispersions measured at a shear rate of about 10,000 s$^{-1}$:

TABLE 2A

| | ICI Viscosity (cps) | |
|---|---|---|
| Pigment | Formulation A | Formulation B |
| uncoated barium ferrite | 105 | 160 |
| coated barium ferrite | 15 | 40 |

Each dispersion was then coated with a knife coater onto 100 micron polyethylene terephthalate film, oriented with a permanent magnet of 1500 G, and air dried. Table 2B shows the squareness and coercivity of each resulting medium. All data were taken on an MH meter at a maximum field strength of 3000 Øe. "Squareness" is defined as the ratio of remanent magnetization over saturated magnetization, and "Hc" is the tape coercivity.

TABLE 2B

| Pigment | Squareness | Hc(φe) |
| --- | --- | --- |
| Samples comprising uncoated barium ferrite | 0.62–0.70 | 1365–1377 |
| Samples comprising coated barium ferrite | 0.81–0.85 | 1331–1355 |

EXAMPLE 3

This example describes the preparation of aqueous solutions of amorphous, hydrolyzed, aluminous, colloidal particles. A solution of basic aluminum chloride was prepared by dissolving 10.45 g aluminum chlorohydrate (47.9% $Al_2O_3$) in 239.55 g deionized water. A solution of 0.78 g of ammonium bicarbonate in 249.22 g of deionized water was added to the aluminum chlorohydrate solution with rapid stirring. The sample was heated at 85° C. for a period of about 5 hours. After this heat treatment, the sample was water clear with no evidence of particles settling. The sample was tested and found to disperse barium ferrite magnetic particles well.

EXAMPLE 4

This example demonstrates the preparation of coated, Co-doped $\gamma$-$Fe_2O_3$ magnetic particles according to the present invention.

Uncoated Co-doped $\gamma$-$Fe_2O_3$ (100 g, 30 $m^2$/g particle with a powder coercivity of 550 Øe and a magnetic moment of 70 emu/g) was added to 400 g of 0.001 M aqueous potassium nitrate and then mixed in a homogenizer for 15 minutes. An aqueous sol comprising amorphous, hydrolyzed, aluminous, colloidal particles was prepared by adding 20 g of Nalco 8676 to 120 g of deionized water. The aqueous sol was then added to the aqueous magnetic suspension while mixing with a homogenizer (high shear mixing conditions). As soon as the aqueous sol was added, and the aqueous magnetic suspension became very fluid. The resultant admixture was then mixed for one hour and then heated at 95° C. for 30 minutes. The admixture was washed with deionized water three times. The supernatant liquid was decanted in each wash. The coated magnetic particles were filtered and dried in vacuo for 4 hours at 110° C.

The resulting coated magnetic particles had very similar surface characteristics to those of amorphous alumina and were easily dispersible in water and in organic solvents. From TEM microphotographs, thin coatings of about 2 nm thickness were observed on the magnetic particles.

EXAMPLE 5

This example demonstrates the preparation of coated, fine metal magnetic particles according to the present invention.

Metal particles (100 g, Type HM-19, 43 $m^2$/g with a powder coercivity of 1546 Øe and a magnetic moment of 124 emu/g, obtained from DOWA, Japan) were added to 400 g of 0.001 M aqueous potassium nitrate and then mixed in a homogenizer for 15 minutes. An aqueous sol comprising amorphous, hydrolyzed, aluminous, colloidal particles was prepared by adding 20 g of Nalco 8676 (10% solid and 2 nm in particle size) to 120 g of deionized water. The aqueous sol was then added to the aqueous magnetic suspension while mixing with a homogenizer (high shear mixing conditions). As soon as the aqueous sol was added, the aqueous magnetic suspension became very fluid. The resultant admixture was then further mixed for one hour, and then washed with deionized water three times. The supernatant liquid was decanted in each wash. The coated magnetic particles were collected by filtration and dried at room temperature.

The coated metal particles, had very similar surface characteristics to those of amorphous alumina and were easily dispersible in water and in organic solvents. From TEM microphotographs, thin coatings of about 2 nm thickness were observed on the magnetic particles.

EXAMPLE 6

This example demonstrates the preparation of coated, chromium dioxide magnetic particles according to the present invention.

Uncoated chromium dioxide magnetic pigment particles (100 g, Type CK-50-21, 35 $m^2$/g particle with a powder coercivity of 660 Øe and a magnetic moment of 75 emu/g, obtained from BASF Corp.) were added to 175 g of 0.001 M aqueous potassium nitrate and then mixed in an ultrasonic mixer for 10 minutes. An aqueous sol comprising amorphous, hydrolyzed, aluminous, colloidal particles was prepared by adding 20 g of Nalco 8676 to 60 g of deionized water. The aqueous sol was then added to the aqueous magnetic suspension. As soon as the aqueous sol was added, coated magnetic particles formed, and the aqueous magnetic suspension became very fluid. The resultant admixture was then ultrasonically mixed for 10 minutes and then heated at 95° C. for 30 minutes. The admixture was cooled to room temperature and then washed with deionized water three times. The supernatant was decanted in each wash. The coated magnetic particles were then filtered and dried in vacuo for 4 hours at 110° C.

The product, coated chromium dioxide particles, had very similar surface characteristics to those of amorphous alumina and were easily dispersible in water and in organic solvents. From TEM microphotographs, thin coatings of about 2 nm thickness were observed on the magnetic particles.

EXAMPLE 7

This example describes the preparation of coated chromium dioxide particles using an alternative reaction scheme.

A 2-liter, rubber-lined ball mill was charged with 4600 g of zirconia mill media (1.3 cm diameter cylinders; Stoneware Corp.; Mahwah, N.J.), 100.0 g chromium dioxide powder (having an average primary dimension of about 0.3 microns; commercially available under the trade designation DuPont D-500-02 from E. I. DuPont de Nemours & Co.; Wilmington, Del.), 6.26 g basic aluminum chloride powder (having an aluminum to chloride ratio of 2.0:1.0 and being 47.9% $Al_2O_3$; commercially available under the trade designation Chlorohydrol from Reheis Chemical Co.), and 600 grams of deionized water. The jar was rotated at 70 rpm for 48 hours. The black, low viscosity admixture was separated from the mill media, and the coated magnetic particles were allowed to settle. The particles settled very slowly and left a turbid black supernatant even after remaining undisturbed for a week. The particles were washed by decantation with deionized water and examined by scanning electron microscopy. Individual acicular $CrO_2$ particles were observed to be coated with a thin (0.8–1.5 nm), essentially continuous, coating. The average thickness of the coating was about 1.0 nm.

EXAMPLE 8

This example describes the preparation of coated, barium ferrite particles from an aqueous sol of the present invention.

20.0 grams of uncoated barium ferrite (actual formula $BaCo_{0.8}Ti_{0.1}Zn_{0.6}Fe_{14.0}O_{23.6}$) were mixed in a "Waring" type blender (Waring Products Division, Dynamics Corp. of America; New Hartford, Conn.) with 200.0 g of deionized water at medium speed. A 6.25 g sample of Nalco 1SJ 614 aqueous sol was added to the rapidly stirred barium ferrite dispersion. The resulting admixture was blended at high speed for about one minute. An aliquot of the admixture was heated at 60° C. to 65° C. for 5 minutes. The solid in this sample was washed 3 times with deionized water (wash water volume of each washing step about equal to twice the dispersion volume) by settling/decantation. A small portion of the resulting dispersion was examined by TEM. The particles were found to be roughly hexagonal platelets with both the sides and the edges coated with a thin, essentially continuous coating. The thickness of the coating ranged from about 1.0 to 2.5 nm.

EXAMPLE 9

This example describes the preparation of coated barium ferrite particles from a colloidal alumina sol.

The process described in Example 8 was repeated with the exception that a larger sample (25 g) of barium ferrite was treated with 7.81 g of Nalco 1SJ 614. The admixture was heat treated and washed with deionized water. The coated particles were filtered and then dried for 1 hour in a vacuum oven at 110° C. The dried particles were pulverized for further testing. The electrokinetic properties of the coated particles were tested and the zeta potential versus pH curve was found to be unlike a barium ferrite surface and essentially identical to that of an amorphous alumina surface.

COMPARATIVE EXAMPLE A

This example demonstrates the disadvantage of depositing the sol coating on the surface of the magnetic pigment along with a significant change in pH to effect such coating.

Barium ferrite powder (25.00 g of same type used in Example 8) was dispersed with medium speed agitation in a solution of 75.09 g deionized water and 3.65 g $AlCl_3.6H_2O$ using a "Waring" type blender. While stirring rapidly, a solution of 2.99 g of ammonium bicarbonate in 25.0 g of water was added dropwise to raise the pH. Gas was given off during the addition of the ammonium bicarbonate. After the addition, the mixture was sheared at high speed. The resulting particles were allowed to settle and then were washed by dilution and decantation as described in Example 7. After settling, the sediment volume was much larger than that produced by the addition of the preformed colloid as in Example 8. TEM examination revealed that a large fraction of the particles were agglomerated and the particles were not uniformly coated.

EXAMPLE 10

This example demonstrates the preparation of a magnetic tape using the coated barium ferrite pigments of Example 1. The magnetic tape was prepared from the following ingredients in the following amounts:

| Ingredient | Parts by weight |
| --- | --- |
| Coated barium ferrite pigment from Example 1 | 100 |
| Sulfonated, hydroxy functional polyurethane polymer | 15 |
| Myristic acid | 2 |
| Butyl stearate | 1 |
| Polyisocyanate compound ("Mondur" CB-601, Mobay Company) | 3 |
| Methyl ethyl ketone | 109 |
| Cyclohexanone | 54 |
| Toluene | 18 |

The sulfonated hydroxy functional polyurethane binder was prepared by condensation polymerization of polycaprolactone diol, dimethyl sodium sulfoisophthalate, neopentyl glycol, methylene diphenyl diisocyanate (MDI), polycaprolactone triol in the ratio (33:3:9:35:20 parts by weight) in accordance with U.S. Pat. No. 5,071,578. The polymer had a weight average molecular weight of about 20,000, a sulfonate equivalent weight of about 10,000, and, a hydroxyl equivalent weight of about 1,500.

The ingredients described above were introduced into a ball mill and mixed with steel media for 2 hours. The resulting dispersion was applied to a polyethylene terephthalate film (thickness: 100 $\mu$m) using a knife coater. The coated film was oriented in a parallel magnetic field of 1800 Gauss immediately after coating and then air dried. The thickness of the dried magnetic layer was about 4 $\mu$m.

EXAMPLE 11

A magnetic tape of this invention was prepared using the same ingredients and procedures as Example 10, except that (a) the coated, Co-doped $Fe_2O_3$ pigments of Example 4 were substituted for the coated barium ferrite pigments of Example 1, and (b) the ingredients were used in the following amounts:

| Ingredient | Parts by Weight |
| --- | --- |
| Coated CO-γ-$Fe_2O_3$ pigment from Example 4 | 100 |
| Sulfonated hydroxy functional polyurethane polymer | 23 |
| Myristic acid | 1.5 |
| Butyl stearate | 1.5 |
| Polyisocyanate compound ("Mondur" CB-601, Mobay Company) | 4 |
| Methyl ethyl ketone | 117 |
| Cylcohexanone | 58.5 |
| Toluene | 19.5 |

EXAMPLE 12

A magnetic tape of this invention was prepared using the same ingredients and procedures as Example 10, except that (a) the coated fine metal magnetic particles of Example 5 were substituted for the coated barium ferrite pigments of Example 1, and (b) the ingredients were used in the following amounts:

| Ingredient | Parts by Weight |
|---|---|
| Alumina coated metal particles from Example 5 | 100 |
| Sulfonated hydroxy functional polyurethane polymer | 18.75 |
| Myristic acid | 1.25 |
| Butyl stearate | 1.25 |
| Polyisocyanate compound ("Mondur" CB-601, Mobay Company) | 3.75 |
| Methyl ethyl ketone | 112.5 |
| Cyclohexanone | 56.25 |
| Toluene | 18.75 |

EXAMPLE 13

A magnetic tape of this invention was prepared using the same ingredients and procedures as Example 10, except that (a) the coated chromium dioxide pigments of Example 6 were substituted for the coated barium ferrite particles of Example 1, and (b) the ingredients were used in the following amounts:

| Ingredient | Parts by Weight |
|---|---|
| Alumina coated chromium dioxide pigments from Example 6 | 100 |
| Sulfonated hydroxy functional polyurethane polymer | 20 |
| Myristic acid | 1.25 |
| Butyl stearate | 1.25 |
| Polyisocyanate compound ("Mondur" CB-601, Mobay Company) | 2.5 |
| Methyl ethyl ketone | 132 |
| Cyclohexanone | 66 |
| Toluene | 22 |

COMPARATIVE EXAMPLE B

A magnetic recording tape was prepared in accordance with Example 10, except that the uncoated barium ferrite of Example 1 was substituted for the coated barium ferrite of Example 1 (50 m²/g Ni-Ti doped pigment having 1250 Øe powder coercivity, 15×50 nm nominal particle size obtained from Toda Inc., Japan).

COMPARATIVE EXAMPLE C

A magnetic recording tape was prepared in accordance with Example 11, except that the uncoated Co-doped γ-Fe$_2$O$_3$ pigments of Example 4 were substituted for the coated Co-doped γ-Fe$_2$O$_3$ pigments of Example 4 (30 m²/g particle with a powder coercivity of 550 Øe and a magnetic moment of 70 emu/g).

COMPARATIVE EXAMPLE D

A magnetic recording tape was prepared in accordance with Example 12, except that the uncoated fine metal magnetic particles of Example 5 were substituted for the coated fine metal magnetic particles of Example 5 (43 m²/g particle with a powder coercivity of 1546 Øe and a magnetic moment of 124 emu/g, obtained from Dowa Inc., Japan under tradename of HM19).

COMPARATIVE EXAMPLE E

A magnetic recording tape was prepared in accordance with Example 13, except that the uncoated chromium dioxide particles of Example 6 were substituted for the coated chromium dioxide particles of Example 6 (35 m²/g particle with a powder coercivity of 660 Øe and a magnetic moment of 75 emu/g, obtained from BASF Corp. under tradename CK-50-21).

EXAMPLE 14

The dispersions prepared in Examples 10, 11, 12, and 13 and in Comparative Examples B, C, D, and E were evaluated for viscosities at shear rate of 10,000 sec-1. The electromagnetic properties of the magnetic tapes prepared in the foregoing examples were also measured. The results are listed in Table 14A.

TABLE 14A

| Example No. | Br (Gauss) | Squareness Ratio | Hc(φe) | 45° Gloss | Viscosity @ 10,000 sec$^{-1}$ |
|---|---|---|---|---|---|
| 10 | 1250 | 0.819 | 1490 | 84 | 11 |
| Comp. B | 990 | 0.721 | 1456 | 22 | 15 |
| 11 | 1440 | 0.896 | 541 | 52 | 31 |
| Comp. C | 1180 | 0.868 | 605 | 40 | 36 |
| 12 | 3120 | 0.882 | 1605 | 109 | 49 |
| Comp. D | 2850 | 0.832 | 1596 | 76 | 75 |
| 13 | 1785 | 0.938 | 793 | 44 | 15 |
| Comp. E | 1195 | 0.879 | 782 | 32 | 19 |

In Table 14A, Br is the measured output of the magnetic tape. Squareness ratio is defined as the ratio of remanent magnetization to saturated magnetization. For randomly oriented magnetic particles, the squareness value is 0.5 and for perfectly oriented particles, the ratio is 1.0. Hc is the coercivity of the tape.

The results in Table 14A clearly show the significant improvement in both electromagnetic properties and dispersion properties when the magnetic pigments are coated in accordance with the present invention. The recording media with the coated magnetic pigments have higher squareness values and higher output (Br) than the media with the uncoated magnetic pigments. The recording media with the coated pigments also have higher 45° gloss values than the media with the uncoated magnetic pigments. This further indicates that there is a high degree of interaction between the polymeric binders and the magnetic pigments. Further, the dispersions containing the coated magnetic pigments have lower viscosities, indicating that such dispersions are more stable than dispersions containing uncoated magnetic pigments.

Other embodiments of this invention will be apparent to those skilled in the art from a consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. A magnetic recording medium comprising a magnetizable layer formed on a nonmagnetizable support, wherein the magnetizable layer comprises 50 to 95 percent by weight coated composite particles dispersed in a polymeric binder, said coated composite particles comprising
   a) a magnetizable core; and
   b) a continuous, amorphous, aluminum hydrous oxide coating formed on the magnetizable core, wherein said coating has an average thickness in the range from about 0.5 to about 5 nanometers.

2. The magnetic recording medium of claim 1, wherein the polymeric binder has hydrophilic groups comprising pendant acidic or ionic moieties, wherein said hydrophilic groups are selected from the group consisting of —$SO_3M$, —$OSO_3M$, —COOM, —$PO(OM')_2$, quaternary ammonium groups, and OH, wherein M is hydrogen, Na, K, Li, or ammonium, and M' is hydrogen, Na, K, Li, ammonium, or a lower alkyl group.

3. The magnetic recording medium of claim 2, wherein the polymer having pendant acidic or ionic moieties is a sulfonated hydroxy functional polyurethane polymer.

4. The magnetic recording medium of claim 2, wherein the polymeric binder is a vinyl chloride copolymer comprising a plurality of OH groups, a plurality of —$SO_3M$ groups, and a plurality of epoxy groups.

5. The magnetic recording medium of claim 1, wherein the polymeric binder comprises a polyurethane polymer having hydrophilic groups and a vinyl chloride copolymer having hydrophilic groups, wherein said hydrophilic groups are selected from the group consisting of —$SO_3M$, —$OSO_3M$, —COOM, —$PO(OM')_2$, quaternary ammonium groups, and OH, wherein M is hydrogen, Na, K, Li, or ammonium, and M' is hydrogen, Na, K, Li, ammonium, or a lower alkyl group.

6. The magnetic recording medium of claim 1, wherein the magnetizable core comprises a hexagonal, platelet-shaped magnetic particle having an easy axis of magnetization perpendicular to the plane of the particle.

7. The magnetic recording medium of claim 1, wherein the magnetizable core comprises $\gamma$-$Fe_2O_3$.

8. The magnetic recording medium of claim 1, wherein the magnetizable core comprises Co-doped $\gamma$-$Fe_2O_3$.

9. The magnetic recording medium of claim 1, wherein the magnetizable core comprises chromium dioxide.

10. The magnetic recording medium of claim 1, wherein the magnetizable core comprises a magnetic metal particle.

11. The magnetic recording medium of claim 1, wherein the magnetizable core comprises $\gamma$-$Fe_3O_4$.

12. The magnetic recording medium of claim 1, wherein the continuous, amorphous, aluminum hydrous oxide coating has a thickness of about 2 nanometers.

* * * * *